March 14, 1939.  S. B. HEATH ET AL  2,150,164

FERTILIZER

Filed Dec. 18, 1934

| EXAMPLE NUMBER | LIGNEOUS MATERIAL USED | WEIGHT OF LIGNEOUS MATERIAL USED (GRAMS) | % $H_2O$ IN LIGNEOUS MATERIAL | NITROGENOUS MATERIAL USED | AMOUNT OF NITROGENOUS MATERIAL | OTHER MATERIALS USED (CATALYST) | WEIGHT OF OTHER MATERIALS USED (GRAMS) | TEMPERATURE (°C) | PRESSURE (#S/IN²) | TIME OF HEATING AND AMMONIATING | WEIGHT OF PRODUCT | % TOTAL $N_2$ | % INSOLUBLE $N_2$ | % TOTAL $N_2$ AS INSOLUBLE $N_2$ | GRAMS $N_2$ PER GRAM ORIGINAL LIGNEOUS MATERIAL | GRAMS INSOLUBLE $N_2$ PER GRAM ORIGINAL LIGNEOUS MATERIAL |
|---|---|---|---|---|---|---|---|---|---|---|---|---|---|---|---|---|
| 1 | Straw | — | 7.98 | $NH_3$ | 430 c.c. per min. | $HgCl_2$ | — | 250° | Atmos. | 2 Hrs. | — | 10.25 | 8.62 | 84.09 | — | — |
| 2 | Straw | 10.8 | 7.98 | $NH_3$ | 430 c.c. per min. | $ZnCl_2$ | — | 285° | Atmos. | 2 Hrs. | 6.80 | 8.96 | 8.12 | 90.62 | .0564 | .0511 |
| 3 | Straw | 10.0 | 7.98 | $NH_3$ | 430 c.c. per min. | $H_3PO_4$ | — | 300° | Atmos. | 4 Hrs. | 6.30 | 9.80 | 8.60 | 87.75 | .0617 | .0542 |
| 4 | Peat | 15.0 | 0 | $NH_3$ | 430 c.c. per min. | $H_2SO_4$ | 6.43 | 300° | Atmos. | 2 Hrs. | 13.30 | 13.60 | 10.50 | 77.20 | .1206 | .0931 |
| 5 | Straw | 12.0 | 7.98 | $NH_3$ | 430 c.c. per min. | $H_2SO_4$ | 9.0 | 350° | Atmos. | 2 Hrs. | 7.80 | 18.70 | 16.73 | 89.41 | .1215 | .1087 |
| 6 | Straw | 12.0 | 7.98 | $NH_3$ | 430 c.c. per min. | HCl | As much as straw would absorb. | 100° $NH_3$, 300 Heat | Atmos. | 15 min $NH_3$, 1½ hrs. Heat | 11.35 | 15.96 | 13.96 | 87.46 | .1509 | .1237 |
| 7 | Straw | 12.0 | 7.98 | $(NH_4)_2SO_4$ | — | — | As much as straw would absorb. | 350° | Atmos. | 2 Hrs. | 8.70 | 15.60 | 11.12 | 71.28 | .1131 | .0806 |

Inventors

SHELDON B. HEATH
AND JOHN W. COREY

By Semmes & Semmes
Attorneys

Patented Mar. 14, 1939

2,150,164

UNITED STATES PATENT OFFICE 2,150,164

FERTILIZER

Sheldon B. Heath and John W. Corey, Midland, Mich., assignors to The Dow Chemical Company, Midland, Mich., a corporation of Michigan Application December 18, 1934, Serial No. 758,133

8 Claims. (Cl. 71—23)

Our invention relates to the ammoniation of fertilizer material, particularly to the ammoniation of wastes, e. g. pulp, remaining after the production of sugars, alcohols, etc., from sugar cane, beets, corn, etc., which wastes are hereinafter referred to as "saccharinic" and "amylaceous" wastes, and to the ammoniation of other ligneous and cellulosic wastes, e. g. peat, sawdust, cornstalks, etc. These materials are all solid porous organic materials.

Many ammoniated products have an excellent fertilizer value, and in the case of starting materials such as straw, peat and others, the material itself before ammoniation is not classed as merely bulk but has in itself a beneficial action on the soil.

Our starting materials are cheap and readily available, and, after treatment by our method, may be used as practical fertilizers, particularly where they have a relatively large insoluble nitrogen content.

When ammoniating materials by prior methods, it has been difficult to produce products having a sufficiently high nitrogen content to enable them to be employed as a concentrated fertilizer. Moreover, the ratio of insoluble nitrogen to total nitrogen in the products prepared by prior processes is relatively low.

It is an object of our invention to provide a fertilizer in which the nitrogen that is in a form which is insoluble in water shall bear a high ratio to the total nitrogen in the fertilizer.

A further object of our invention is to provide a process in which fertilizers may be manufactured that have a high total nitrogen content.

Yet another object of our invention is to provide a process that is economical, that may be performed with simple apparatus, and which will make a good fertilizer at low cost.

Still another object of our invention is to provide means for catalyzing the reaction of straw, peat and similar materials with ammonia, so that the fertilizer value of the material treated is greatly increased over that which can be expected under similar conditions of treat, but in the absence of our catalysts.

In general our process comprises treatment of a material, such as peat or straw, with ammonia either with a catalyst which is a salt of an acid, preferably an inorganic acid, or with the acid itself or a mixture of salts and acid. Obviously mixtures of salts, or mixtures of acids, or both, may be employed.

A further method of effecting ammoniation of the material treated is to place the material in contact with an ammonium salt and allow the material to soak up the salt in an aqueous solution for a sufficient period of time to become thoroughly impregnated therewith. The impregnated material is then subjected to an elevated temperature and becomes ammoniated at elevated temperatures.

In general we have found that the optimum temperatures in carrying out this process lie between 300° C. and 350° C. though good results can be achieved outside of this range, either above or below it.

In our nitrogenous fertilizers, a high percentage of insoluble nitrogen to total nitrogen content is desirable, since nitrogen compounds which are but slightly soluble in water (and these are classed as insolubles) are slowly available as plant fertilizer, thus enabling the one who uses our fertilizer material to accurately determine the necessary dosage for the land, since heavy rains will not tend to greatly change the effect of a particular dosage applied. Where fertilizers are of high solubility, heavy rains often wash the fertilizer material off the land, since they become dissolved in the rain water.

Some of the salts which may be used to catalyze the reaction are calcium chloride, mercuric chloride, zinc chloride, copper sulphate, sodium acid sulphate, mono- or di-sodium phosphate, ammonium phosphates, etc. The salts may be in some instances employed in admixture with acids to catalyze ammoniation of the materials contemplated. For instance, we have used with good effect the combination of calcium chloride, and hydrochloric acid as a catalyzing agent.

Another catalyst that we have employed is monobasic potassium phosphate ($KH_2PO_4$). There are a number of other salts of acids, or acid salts, which can be employed to catalyze the reaction.

While the examples we give are those of runs made at atmospheric pressure, we do not wish to be limited to processes which are conducted at atmospheric pressure only, since the catalysts we provide will effectively operate at pressures other than atmospheric.

In the drawing the single figure is a table showing the results of ammoniation carried out in the various runs, the figures for which are given in this specification.

We will now give some examples of runs which we have made, and the results which we have achieved in our process for catalytic ammoniation of amylaceous, saccharinic, ligneous and cellulosic wastes.

The following example is one in which we have employed mercuric chloride as the catalyst. It is to be noted that the percentage of insoluble nitrogen to total nitrogen is relatively high.

Example No. 1

Ammoniation of straw, using $HgCl_2$ as a catalyst, at 250° C. and atmospheric pressure.

Procedure

A mixture of chopped straw and $HgCl_2$ (dry, 7.98% $H_2O$) was subjected to a stream of $NH_3$ gas at the rate of 430 cc. per minute for 2 hours (which comprised an excess of ammonia, that is to say more ammonia than the straw would retain). The temperature was maintained at 250° C.

Results and conclusions

|  | Per cent |
|---|---|
| Total $N_2$ | 10.25 |
| Insol. $N_2$ | 8.62 |
| Total $N_2$ as insoluble $N_2$ | 84.09 |

The use of the catalyst raises the total nitrogen content considerably higher than can be obtained at the same temperature without the use of the catalyst, and also gives a high percentage of insoluble nitrogen.

Another catalyst that has proved to be exceedingly useful in this reaction is zinc chloride, and the example which follows is one of the process in which this material was used as a catalyst for the ammoniation of straw.

Example No. 2

Ammoniation of straw at 285° C. and atmospheric pressure for 2 hours using a solution of $ZnCl_2$.

Procedure 10.8 grams of straw (dry having 7.98% of $H_2O$) was wetted with 10 cc. of a $ZnCl_2$ solution containing 0.190 g. $ZnCl_2$ per cc. This mixture was heated at 285° C. and $NH_3$ passed therethrough at a rate of 430 cc. per minute for 2 hours.

Results and conclusions

Analysis (6.80 g. product)

| Total $N_2$ | 8.96% |
|---|---|
| Insol. $N_2$ | 8.12% |
| Total $N_2$ as insoluble $N_2$ | 90.62% |
| Grams of $N_2$ per gram of original ligneous material | .0564 |
| Grams of insoluble $N_2$ per gram of orig. lig. material | .0511 |

$ZnCl_2$ acts as a very good catalyst.

This catalyst also materially increased the total nitrogen over what could be expected in the ammoniation of straw under the conditions specified without the use of the catalyst. Further, the insoluble nitrogen is 90.62% of the total nitrogen, and this, under certain conditions, is very desirable, as it makes the fertilizer slowly available.

As previously stated, we have found that acids, particularly inorganic acids, may be employed as catalysts for the ammoniation of the materials of the class specified. We have used a number of acids, but we shall give examples only of runs made using phosphoric acid, sulphuric acid, and hydrochloric acid. The phosphoric acid in the particular run used was $H_3PO_4$, the orthophosphoric acid.

The following example, No. 3, shows a run in which orthophosphoric acid was used as the catalyst.

Example No. 3

Ammoniation of straw, sprayed with an 8.5% solution of phosphoric acid, at 300° C. and atmospheric pressure for 4 hours.

Procedure

Approximately 10 g. of straw, (dry, 7.98% $H_2O$) sprayed with 10 cc. of an 8.5 solution of $H_3PO_4$, was heated at 300° C. for 4 hours at atmospheric pressure, while passing $NH_3$ gas therethrough at a rate of 430 cc. per minute.

Results and conclusions

Analysis (6.30 g. product)

| Total $N_2$ | per cent | 9.80 |
|---|---|---|
| Insol. $N_2$ | per cent | 8.60 |
| Total $N_2$ as insoluble $N_2$ | per cent | 87.75 |
| $N_2$ per gram of original ligneous material | gram | .0617 |
| Insoluble $N_2$ per gram of original ligneous material | gram | .0542 |

The $H_3PO_4$ acts not only as a catalyst, but the phosphorus is also of fertilizer value. It is much cheaper than $HgCl_2$ and furnishes the phosphate which is desirable for a complete fertilizer.

One advantage of the particular catalyst used in the last run is that it is considerably cheaper than mercuric chloride, and also that it furnishes a constituent in the final product which has a fertilizer value, i. e., the phosphate.

Very excellent results have been achieved with sulphuric acid. In general, it has been found that the best results in the catalytic ammoniation of the specified materials have been obtained at temperatures between 300° C. and 350° C. Some of our researches have indicated that optimum results are achieved around the higher temperature limit, namely 350° C. In the following run, Example 4, we have indicated the use of sulphuric acid at a temperature around 300° C.

Example No. 4

Ammoniation of peat at 300° C. and atmospheric pressure for two hours after the peat, sprayed with dilute sulphuric acid, stood for 18 hours.

Procedure 15 grams of oven-dried peat was sprayed with 20 cc. of dilute $H_2SO_4$ (equivalent to 6.43 grams conc. $H_2SO_4$) and allowed to stand. After 18 hours, this peat and $H_2SO_4$ were ammoniated at 300° C. and atmospheric pressure for two hours with $NH_3$ passed therethrough at the rate of 430 cc. per minute.

Results and conclusions

Analysis (13.30 grams of product)

| Total $N_2$ | Per cent | 13.60 |
|---|---|---|
| Insol. $N_2$ | Per cent | 10.50 |
| Total $N_2$ as insoluble $N_2$ | Per cent | 77.20 |
| $N_2$ per gram original ligneous material | gram | .1206 |
| Insoluble $N_2$ per gram original ligneous material | gram | .0931 |

In the following example, No. 5, we have shown a run which was made with sulphuric acid at approximately 350° C.

Example No. 5

Ammoniation of straw (dry, 7.98% $H_2O$) using a solution of $H_2SO_4$ as catalyst at 350° C. and atmospheric pressure for two hours.

Procedure 12 grams of straw was sprayed with 10 cc. of a 60% solution of $H_2SO_4$ (sp. g., 1.49) and allowed to stand for two weeks. This straw was subjected to a stream of $NH_3$ gas, at the rate of 430 cc. per minute two hours.

Results and conclusions

Analysis (7.80 grams product)

| | |
|---|---|
| Total $N_2$ _____Per cent__ | 18.70 |
| Insol. $N_2$ _____Per cent__ | 16.73 |
| Total $N_2$ as insoluble $N_2$ _____Per cent__ | 89.41 |
| $N_2$ per g. of original ligneous material _____gram__ | .1215 |
| Insoluble $N_2$ per gram of original ligneous material _____gram__ | .1087 |

There was only a small amount of ammonium sulphate collected around the cooler part of the tube, less than in other runs at lower temperatures.

To make sure that this insoluble nitrogen was not due to the large particle size of the straw, it was ground very fine and analyzed again.

| | Per cent |
|---|---|
| Total $N_2$ _____ | 18.12 |
| Insol. $N_2$ _____ | 16.52 |

This material was then washed with about 250 cc. of water. It was thought that the $H_2SO_4$ may only act as liberator for the humic acid and by washing out the $H_2SO_4$ the total weight would be decreased with a consequent increase in nitrogen.

This was analyzed and showed 19.37% total $N_2$.

The wash water showed a total of 0.13 gram $SO_4$ and 0.03 gram $N_2$.

It will be noted that the total nitrogen is high, and that the insoluble nitrogen is 89.41% of the total nitrogen. The results of this run are very satisfactory.

In the following example, No. 6, we have shown a process employing hydrochloric acid as a catalyst.

EXAMPLE No. 6

Ammoniation of straw, using HCl as a catalyst, at 300° C. and atmospheric pressure for about two hours.

Procedure 12 grams of straw (dry, 7.98% $H_2O$ was saturated with 18% HCl and allowed to stand for one hour. It was ammoniated by passing over the straw ammonia gas while gradually raising the temperature to 100° C. for 15 minutes. The passage of ammonia was discontinued and the material was heated at 300° C. and atmospheric pressure for 1½ hours.

Results and conclusions

Analysis

| | |
|---|---|
| Weight of product_____grams__ | 11.35 |
| Total $N_2$ _____Per cent__ | 15.96 |
| Insol. $N_2$ _____Per cent__ | 13.96 |
| Total $N_2$ as insoluble $N_2$ _____Per cent__ | 87.46 |
| $N_2$ per g. of original ligneous material _____gram__ | .1509 |
| Insol. $N_2$ per gram original ligneous material _____gram__ | .1237 |

A third method of treatment which we have before referred to that gives excellent results, forming a product having a high total nitrogen content and a large percentage of practically insoluble nitrogen, is one in which we employ ammonium sulphate. In this treat we do not employ any ammonia gas, but obtain the nitrification of the material by reason of the ammonium radical in the sulphate itself. Other ammonium salts besides ammonium sulphate may be employed, and we do not wish to be limited in the application of our invention to ammonium sulphate alone.

The following run, Example No. 7, shows very excellent results, particularly in view of material costs and also because the process is exceedingly simple, merely requiring heating of the material, such as peat, or straw, with the sulphate.

EXAMPLE No. 7

Straw was soaked in a saturated solution of $(NH_4)_2SO_4$ for four days and then heated at 350° C. for two hours to see if the insoluble $N_2$ content could be increased in this manner.

Procedure 12 grams of straw (dry, 7.98% $H_2O$) was soaked in a saturated solution of ammonium sulphate for four days. The liquid was drained off and the straw was heated for two hours at 350° C.

Results and conclusions

Analysis (8.70 grams product)

| | |
|---|---|
| Total $N_2$ _____percent__ | 15.60 |
| Insol. $N_2$ _____percent__ | 11.12 |
| Total $N_2$ as insoluble $N_2$ _____percent__ | 71.28 |
| $N_2$ per gram of original ligneous material _____gram__ | .1131 |
| Insoluble $N_2$ per g. original ligneous material _____gram__ | .0806 |

We may also employ other salts besides ammonium sulphate, but, in general, we prefer to employ a salt which has an ammonium radical, for example ammonium chloride, so that the ammoniation can be accomplished by reason of this radical in the salt. Some forms of salts are particularly adaptable for this type of process since they have not only the ammonium radical, but also contain radicals which are available to form a complete fertilizer. A substance of this kind is ammonium phosphate, which contains the ammonium radical as well as the phosphate radical, and thus is highly desirable in the treatment of the type specified.

All of these examples have been grouped together for ready reference in a single sheet of drawings. It is to be noted that Example No. 7, which illustrates a very economical process from the point of view of apparatus required and material used, gave a good total yield of nitrogen and a high percentage of insoluble nitrogen to total nitrogen. The highest percent of total nitrogen, as well as a very high percent of insoluble nitrogen to total nitrogen, is achieved by the process carried out in accordance with Example No. 5, which, it will be noted, is one employing sulphuric acid as a catalyst and a temperature of 350° C.

The nitrification of peat, straw and the like by reacting it at elevated temperatures with ammonium salts or with ammonia and ammonium salts takes place with some loss of the values therein, such as $NH_3$, or acid radical, or both, in the evolved gases, unless said gases are scrubbed for recovery of such values. In the practical operation of the process the gases evolved from the nitrifying reaction are passed through a wet scrubber tower, the circulating scrubber solution of which is kept approximately neutral by the addition of ammonia or said acid, as required, so that it is maintained as an effective absorbent for the values in the gases passing therethrough. When the scrubber liquor becomes sufficiently concentrated, it is used to saturate peat, straw, etc. entering the nitrifying step, thus making for an efficient use of materials.

While we have shown a number of examples and described several alternate forms of our invention, it is to be understood that we are only to be limited by the scope of the appended claims and the showing of the prior art.

We claim:

1. In a method of making a fertilizer, the step which consists in heating a solid porous organic material to a temperature above 250° C. with ammonia and a strong mineral acid.

2. In a method of making a fertilizer, the step which consists in heating a mixture of a solid porous organic material and an ammonium salt of a strong inorganic acid to a temperature above 250° C.

3. In a method of making a fertilizer, the step which consists in passing ammonia gas at substantially atmospheric pressure through a mixture of a solid porous organic material and a strong mineral acid while heating the mixture to a temperature above 250° C.

4. In a method of making a fertilizer, the step which consists in heating peat to a temperature above 250° C. with ammonia in the presence of a strong mineral acid.

5. In a method of making a fertilizer, the step which consists in heating a mixture of peat and an ammonium salt of a strong mineral acid to a temperature of at least 250° C. at atmospheric pressure.

6. In a method of making a fertilizer, the step which consists in heating a mixture of peat and ammonium sulphate to a temperature of at least 250° C. at atmospheric pressure.

7. In a method of making a fertilizer, the step which consists in heating straw to a temperature above 250° C. with ammonia in the presence of a strong mineral acid.

8. In a method of making a fertilizer, the step which consists in heating a mixture of straw and ammonium sulphate to a temperature of at least 250° C. at atmospheric pressure.

JOHN W. COREY.
SHELDON B. HEATH.